(12) United States Patent
Doi et al.

(10) Patent No.: US 7,228,950 B2
(45) Date of Patent: Jun. 12, 2007

(54) FLUID TRANSMISSION APPARATUS WITH LOCKUP CLUTCH

(75) Inventors: Junichi Doi, Hiroshima-ken (JP);
Shinya Kamada, Hiroshima-ken (JP);
Norio Iwashita, Hiroshima-ken (JP);
Kazuhito Maeda, Neyagawa (JP)

(73) Assignees: Mazda Motor Company, Hiroshima (JP); Exedy Corporation, Osaka (JP)

( * ) Notice: Subject to any disclaimer, the term of this patent is extended or adjusted under 35 U.S.C. 154(b) by 201 days.

(21) Appl. No.: 11/078,474

(22) Filed: Mar. 14, 2005

(65) Prior Publication Data

US 2005/0211522 A1    Sep. 29, 2005

(30) Foreign Application Priority Data

Mar. 29, 2004    (JP) .............................. 2004-096201

(51) Int. Cl.
*F16H 45/02*    (2006.01)
(52) U.S. Cl. ...................................... 192/3.29; 192/212
(58) Field of Classification Search ..................... None
See application file for complete search history.

(56) References Cited

U.S. PATENT DOCUMENTS 4,646,886 A  * 3/1987  Nishimura ................. 192/3.28
5,224,576 A  * 7/1993  Fujimoto .................... 192/3.28
5,613,582 A    3/1997  Jackel
6,109,406 A  * 8/2000  Takagi et al. ............... 192/3.29

FOREIGN PATENT DOCUMENTS

| JP | 58-225224 |   | 12/1983 |
|----|-----------|---|---------|
| JP | 59043255 A | * | 3/1984 |
| JP | 8-270751 |   | 10/1996 |
| JP | 11-351353 |   | 12/1999 |

* cited by examiner

*Primary Examiner*—Richard M. Lorence

(57) ABSTRACT

A transmission apparatus is disclosed which can improve the locking response speed of a lockup clutch when an engine is driven by the output side, without largely changing the structure of the lockup clutch or the like. In the lockup clutch of this transmission apparatus, fixing portions (21a) for a support member (24) of a damper spring (23) are fixed to a plurality of portions on a predetermined circumference of a piston (21) which are inside a friction member (22). Projections (21b) extending in the radial direction are formed, at those positions of the lockup piston (21) which are inside the friction member (22) and sandwiched by the fixing portions (21a) for the support member (24) of the damper spring (23), to project toward a front cover.

4 Claims, 7 Drawing Sheets

FLUID TRANSMISSION APPARATUS WITH LOCKUP CLUTCH

FIELD OF THE INVENTION

The present invention relates to a fluid transmission apparatus which is used in a vehicle change gear and has a lock up clutch.

BACKGROUND OF THE INVENTION

A torque converter having a lockup clutch is sometimes provided between an engine and change gear mechanism. For example, as shown in FIG. 6, this torque converter 110 has a front cover 111 connected to an input shaft (engine output shaft) 101, a pump 112 fixed to the front cover 111, a turbine 113 arranged to oppose the pump 112, and a stator 115 which is supported by a change gear case 102 through a one-way clutch 114 and arranged between the pump 112 and turbine 113 and has a torque increasing function. The inner space defined by the front cover 111 and a shell 112a of the pump 112 is filled with a working oil (fluid). The turbine 113 is driven by the pump 112 through the working fluid. A base portion 113a of the turbine 113 is spline-coupled to an output shaft 103 (turbine shaft). Rotation of the turbine 113 is output to a change gear mechanism (not shown) through the output shaft 103.

A lockup clutch 120 is arranged between the front cover 111 and turbine 113 to mechanically connect them. The lockup clutch 120 has a lockup piston 121 (to be merely referred to as a piston 121 hereinafter) which can be moved in the axial direction on the base portion 113a of the turbine 113 by a change in working hydraulic pressure (fluid pressure). The piston 121 partitions the space defined by the front cover 111 and the shell 112a of the pump 112 into a front chamber (releasing hydraulic chamber) X' and rear chamber (locking hydraulic chamber) Y'.

A friction member 122 is attached to the outer portion of that surface of the piston 121 which opposes the front cover 111. A plurality of damper springs 123 are provided to the outer portion of that surface of the piston 121 which opposes the turbine 113. A support member 124 for the damper springs 123 is fixed to annular fixing portions 121a, which are inside the friction member 122, of the piston 121 with a plurality of rivets 125. A driven member 126 which engages with the damper springs 123 is fixed to the outer portion of that surface of the turbine 113 which opposes the piston 121.

With this structure, when a locking hydraulic pressure is supplied to the rear chamber Y', the piston 121 is moved by the hydraulic pressure toward the front cover 111 and urged against it through the friction member 122. Consequently, the input shaft 101 and output shaft 103 are mechanically coupled (directly coupled) to each other. When a releasing hydraulic pressure is supplied to the front chamber X', the piston 121 is moved by the hydraulic pressure to the counter front cover 111 side and separates from the front cover 111, to cancel mechanical coupling of the input shaft 101 and output shaft 103. Other than the hydraulic pressure, a centrifugal pressure generated by rotation of the working fluid acts on the front and rear chambers X' and Y'. The higher the rotational speed (rotation count or the like) of the working fluid, the larger the centrifugal pressure. Also, the farther from the rotation center, the larger the centrifugal pressure.

In a converter state wherein the torque converter 110 is not locked, when deceleration is started, usually, the rotational speed of the output shaft 103 becomes higher than that of the input shaft 101 (engine output shaft). More specifically, the rotational speed of the front cover 111 becomes lower than that of the piston 121. Accordingly, the rotational speed of the working fluid in the front chamber X' is influenced by the slow rotation of the front cover 111 to become lower than the rotational speed of the working fluid in the rear chamber Y'. In this case, the front and rear chambers X' and Y' communicate with each other through their outermost portions. Therefore, the centrifugal pressure of the working fluid in the front chamber X' and that in the rear chamber Y' become almost equal to each other at the outermost portions, as shown in FIG. 7, but become different from each other at portions inner than the outermost portions. More specifically, the rotational speed of the working fluid is higher in the rear chamber Y' than in the front chamber X'. Accordingly, a change in the radial direction in centrifugal pressure of the working fluid becomes larger in the rear chamber Y' than in the front chamber X'. Consequently, the centrifugal pressure in the front chamber X' becomes relatively higher than that in the rear chamber Y'.

During deceleration, for example, fuel supply is interrupted to control the engine. When the fuel supply is interrupted, the lockup clutch 120 is locked to prevent an engine stall and provide an engine braking effect, and then the engine is driven by the output side.

When the lockup clutch 120 is in the converter state, if deceleration is started, on the inner side, the centrifugal pressure of the working fluid in the front chamber X' is relatively higher than that of the working fluid in the rear chamber Y', as described above. Thus, the piston 121 is biased to the releasing side and the lockup clutch 120 is difficult to lock. In other words, the locking response speed of the lockup clutch 120 decreases. If fuel supply is interrupted in this state, an engine stall may undesirably occur.

In view of this problem, in order to decrease the difference in centrifugal pressure of the working fluid between the front and rear chambers, for example, according to Japanese Patent Laid-Open No. 8-270751 (U.S. Pat. No. 5,613,582A and D.E.No. 4,433,256A1), an impeller member is arranged on that surface of a lockup piston which opposes a front cover. The impeller member rotates working fluid in a front chamber, so that the rotational speed of the working fluid becomes close to the rotational speed of the lockup piston.

According to Japanese Patent Laid-Open No. 11-351353, a plurality of radial ribs projecting toward a case are formed on that surface of a lockup piston which opposes a front cover (alternatively, recessed grooves are formed in the counter front cover side of the lockup piston). In Japanese Patent Laid-Open No. 11-351353, the ribs are provided to increase the pressure of the working fluid in the front chamber, so that when a clutch facing formed on that surface of the lockup piston which opposes the front cover comes into contact with the inner surface of the front cover, the facing is prevented from separating. With this arrangement, the same effect as that described in Japanese Patent Laid-Open No. 8-270751 can be obtained, although consequently.

According to Japanese Patent Laid-Open No. 58-225224, a support member for damper springs is fixed to a lockup piston with rivets. A plurality of radial ribs are formed on the lockup piston (or recessed grooves are formed in the counter front cover side of the lockup piston).

If the impeller member described in Japanese Patent Laid-Open No. 8-270751 is to be applied to the torque converter 110 having the structure shown in FIG. 6, not only the piston 121 of the lockup clutch 120 but also the structure of the torque converter 110 itself must be changed largely.

The ribs described in Japanese Patent Laid-Open No. 11-351353 can be applied to the piston 121 of the torque converter 110 without largely changing the structure or the like. To improve the locking response speed of the clutch, the ribs are desirably formed as long as possible in the radial direction, so that as much working fluid as possible can be held. In the torque converter 110, the support member 124 for the damper springs 123 is attached to the annular fixing portions 121a with the plurality of rivets 125, as described above. If the ribs extend long in the radial direction, they may undesirably interfere with the rivets 125 or fixing portions 121a.

It is supposed that Japanese Patent Laid-Open No. 58-225224 is originally mainly aimed at reinforcement of the lockup piston. The ribs project to the counter front cover side from that surface of the lockup piston where a friction member is provided. In this case, at a portion where the ribs are formed, since the gap between the front-cover-side surface of the lockup piston and the lockup-piston-side surface of the front cover increases, the working fluid is not held sufficiently, and the working fluid between these two surfaces cannot be sufficiently rotated in the circumferential direction.

SUMMARY OF THE INVENTION

The present invention has been made to solve the problems of the prior art, and improves, in a fluid transmission apparatus having a lockup clutch, the locking response speed of the lockup clutch when an engine is driven by the output side, without largely changing the structure of the lockup clutch or the like.

According to the present invention, the foregoing object is attained by providing a fluid transmission apparatus used together with a vehicle change gear and having a lockup clutch, comprising:

an input member which inputs a driving force from an engine to the fluid transmission apparatus;

an output member which outputs the driving force from the fluid transmission apparatus to the vehicle change gear;

a front cover coupled to the input member;

a turbine coupled to the output member;

a lockup piston which is arranged between the front cover and turbine and moved in an axial direction by a change in hydraulic pressure;

a friction member formed on an outer portion of a surface of the lockup piston which opposes the front cover;

a damper spring which connects the lockup piston and turbine;

a support member for the damper spring which is fixed to a plurality of fixing portions on a predetermined circumference of the lockup piston which are inside the friction member; and projections projecting toward the front cover from positions on the lockup piston which are sandwiched by the fixing portions.

Other features and advantages of the present invention will be apparent from the following description taken in conjunction with the accompanying drawings, in which like reference characters designate the same or similar parts throughout the figures thereof.

DETAILED DESCRIPTION OF THE PREFERRED EMBODIMENTS

A preferred embodiment(s) of the present invention will now be described in detail with reference to the drawings. It should be noted that the relative arrangement of the components, the numerical expressions and numerical values set forth in these embodiments do not limit the scope of the present invention unless it is specifically stated otherwise.

A torque converter according to an embodiment of the present invention will be described.

Figure 1:
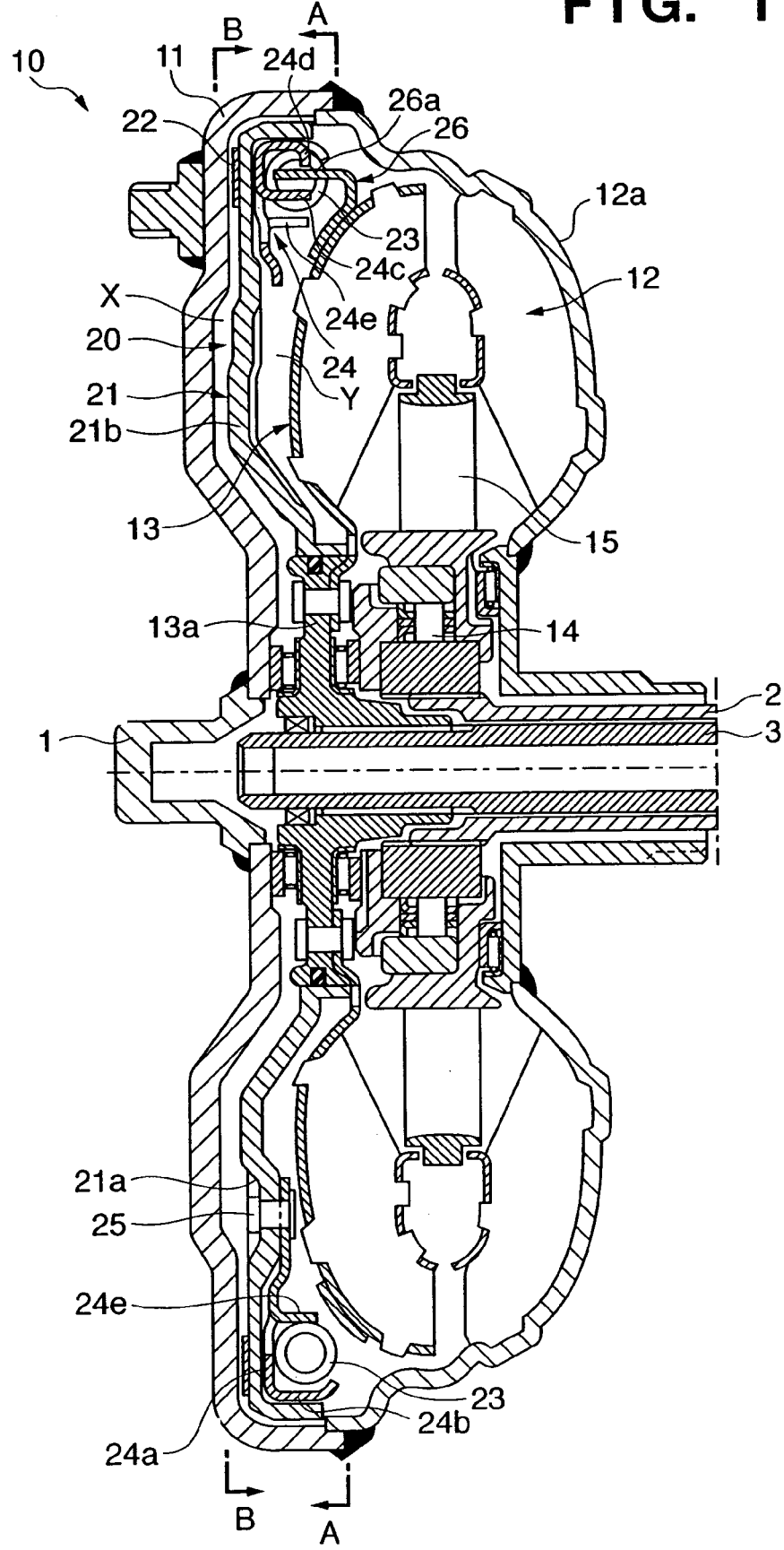
FIG. 1 is a longitudinal sectional view of a torque converter according to an embodiment of the present invention.

As shown in FIG. 1 (sectional view taken along the line C-C of FIG. 2), a torque converter 10 according to this embodiment has a front cover 11 coupled to an input shaft 1 (engine output shaft), a pump 12 fixed to the front cover 11, a turbine 13 arranged to oppose the pump 12, and a stator 15 which is supported by a change gear case 2 through a one-way clutch 14 and arranged between the pump 12 and turbine 13 and has a torque increasing function. The inner space defined by the front cover 11 and a shell 12a of the pump 12 is filled with a working fluid. The turbine 13 is driven by the pump 12 through the working fluid (fluid). A base portion 13a of the turbine 13 is spline-coupled to an output shaft 3 (turbine shaft). Rotation of the turbine 13 is output to a change gear mechanism (not shown) through the output shaft 3.

A lockup clutch 20 is arranged between the front cover 11 and turbine 13 to mechanically connect them. The lockup clutch 20 has a lockup piston 21 (to be merely referred to as a piston 21 hereinafter) which can be moved in the axial direction on the base portion 13a of the turbine 13 by a change in working hydraulic pressure. The piston 21 partitions the space defined by the front cover 11 and the shell 12a of the pump 12 into a front chamber (releasing hydraulic chamber) X and rear chamber (locking hydraulic chamber) Y. The piston 21 can rotate in the circumferential direction relative to the base portion 13a of the turbine 13 within the stretching/contracting range of damper springs 23 (to be described later).

Figure 2:
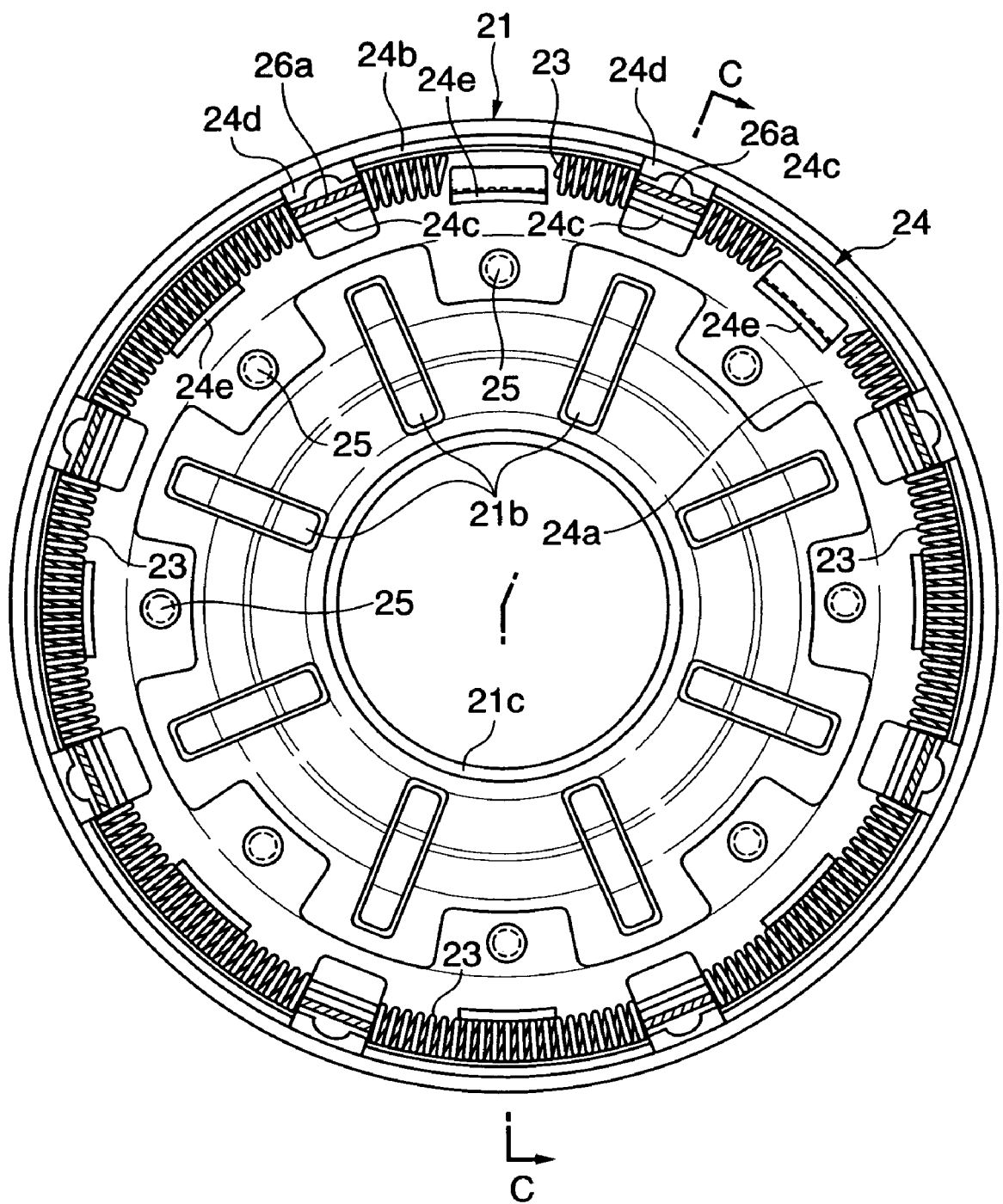
FIG. 2 is a partially cutaway view taken along the line of arrows A-A of FIG. 1 (components other than a lockup piston are not shown when appropriate)

A friction member 22 is attached to the outer portion of that surface of the piston 21 which opposes the front cover 11. The plurality of damper springs 23 are provided to the outer portion of that surface of the piston 21 which opposes the turbine 13, as shown in FIG. 2 as well. A support member 24 for the damper springs 23 is fixed to a plurality of fixing portions 21a, which are inside the friction member 22 and formed on one circumference, of the piston 21 with rivets 25. The support member 24 supports the inner and outer sides of the circumferential ends of the damper springs 23 by inner and outer bent portions 24c and 24d cut out and raised from an annular disk portion 24a and outer cylindrical portion 24b, respectively, the outer sides of the side portions of the damper springs 23 by the outer cylindrical portion 24b, and the inner sides of the side portions of the damper springs 23 by side bent portions 24e cut out and raised from the annular disk portion 24a.

A driven member 26 is fixed to the outer portion of that surface of the turbine 13 which opposes the piston 21. The driven member 26 has engaging portions 26a extending toward the piston 21. The engaging portions 26a are inserted between the inner and outer bent portions 24c and 24d of the support member 24.

Figure 3:
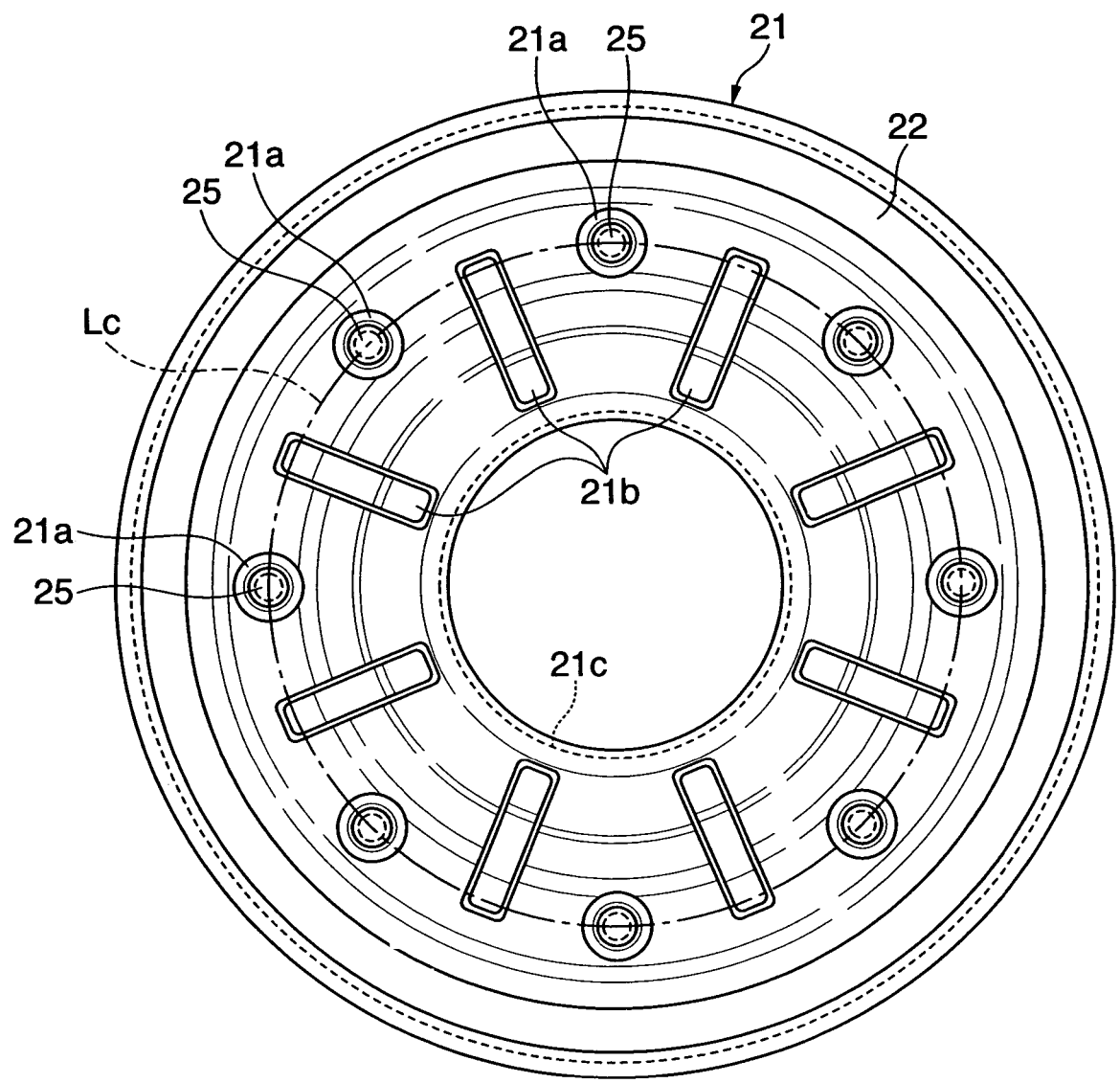
FIG. 3 is a view taken along the line of arrows B-B of FIG. 1 (components other than the lockup piston are not shown when appropriate)
Figure 4:
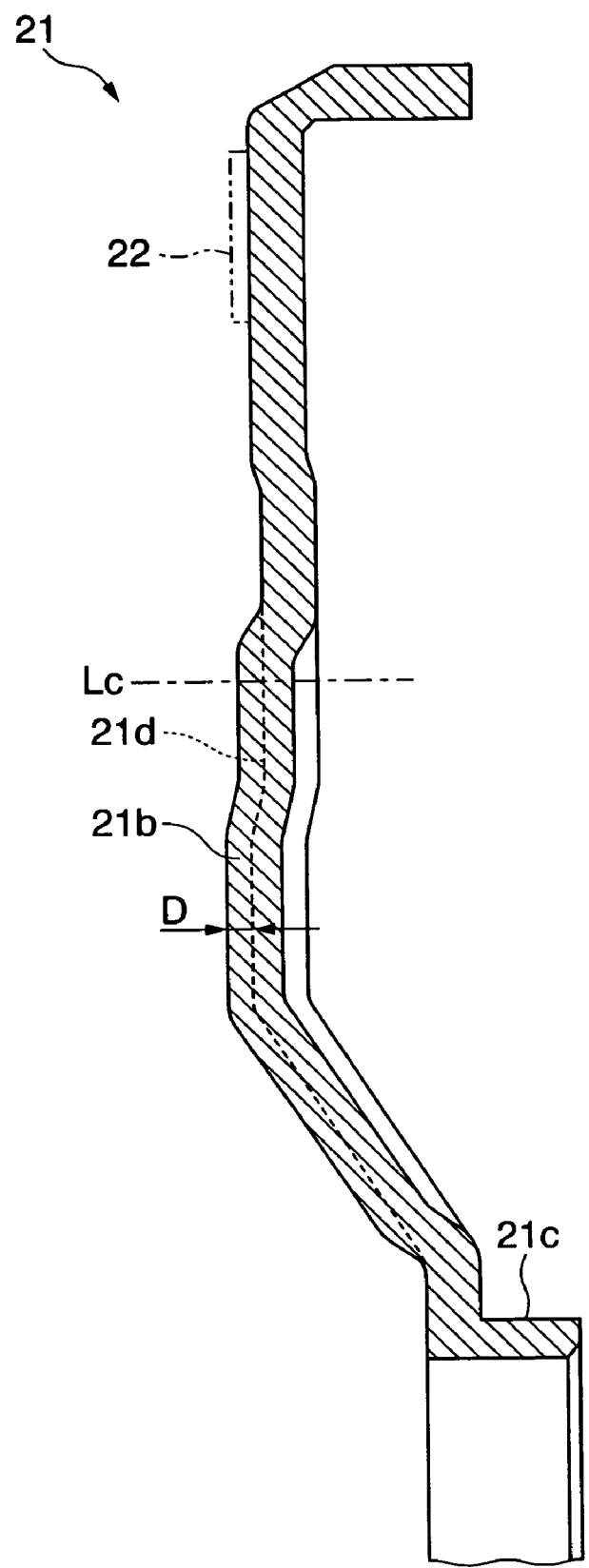
FIG. 4 is an enlarged view of a portion near projections of the lockup piston.

A plurality of projections 21b are formed, on that portion of the piston 21 which is inside the friction member 22, at positions sandwiched by the fixing portions 21a for the support member 24 of the damper springs 23. As shown in FIGS. 3 and 4, the projections 21b extend radially from the vicinity of an inner cylindrical portion 21c of the piston 21 to the outer side of a circumference Lc which extends through the centers of the fixing portions 21a, and project from a front cover 11-side reference surface 21d of the piston 21 toward the front cover 11 by a predetermined amount D. The predetermined amount D is set to a value that does not influence the axial size of the torque converter 10 and can sufficiently hold the working fluid.

As shown in FIG. 3, the fixing portions 21a for the support member 24 which are formed on the piston 21 have round shapes when seen from the top, and bulge to the counter front cover 11 side (toward the turbine 13), as shown in FIG. 1. The projections 21b and fixing portions 21a are formed by pressing a metal plate member.

The fixing portions 21a for the support member 24 of the damper springs 23 and the projections 21b are arranged alternately in the circumferential direction and evenly at equiangular intervals on a circumference.

The function of the torque converter 10 will be described.

When a locking hydraulic pressure is supplied to the rear chamber Y from a hydraulic circuit (not shown), the piston 21 is moved by the hydraulic pressure toward the front cover 11 and urged against it through the friction member 22. Consequently, the power input from the input shaft 1 to the front cover 11 is transmitted to the turbine 13 through the friction member 22, piston 21, support member 24, damper springs 23, and driven member 26, and then from the base portion 13a to the output shaft 3. Namely, the input shaft 1 and output shaft 3 are mechanically coupled (directly coupled) to each other.

When a releasing hydraulic pressure is supplied to the front chamber X, the piston 21 is moved by the hydraulic pressure to the counter front cover 11 side and separates from the front cover 11. Consequently, the power input from the input shaft 1 to the front cover 11 is transmitted to the turbine 13 through the working fluid, and then from the base portion 13a of the turbine 13 to the output shaft 3. Namely, the mechanical coupling between the input shaft 1 and output shaft 3 is released.

In this case, other than the hydraulic pressure, a centrifugal pressure generated by rotation of the working fluid acts on the front and rear chambers X and Y. According to the torque converter 10 of this embodiment, the radially extending projections 21b are formed, on that portion of the piston 21 which is inside the friction member 22, at positions sandwiched by the fixing portions 21a for the support member 24 of the damper springs 23. Thus, the long projections 21b can be arranged efficiently in the limited space in the torque converter 10 without interfering with the fixing portions 21a and rivets 25.

Figure 5:
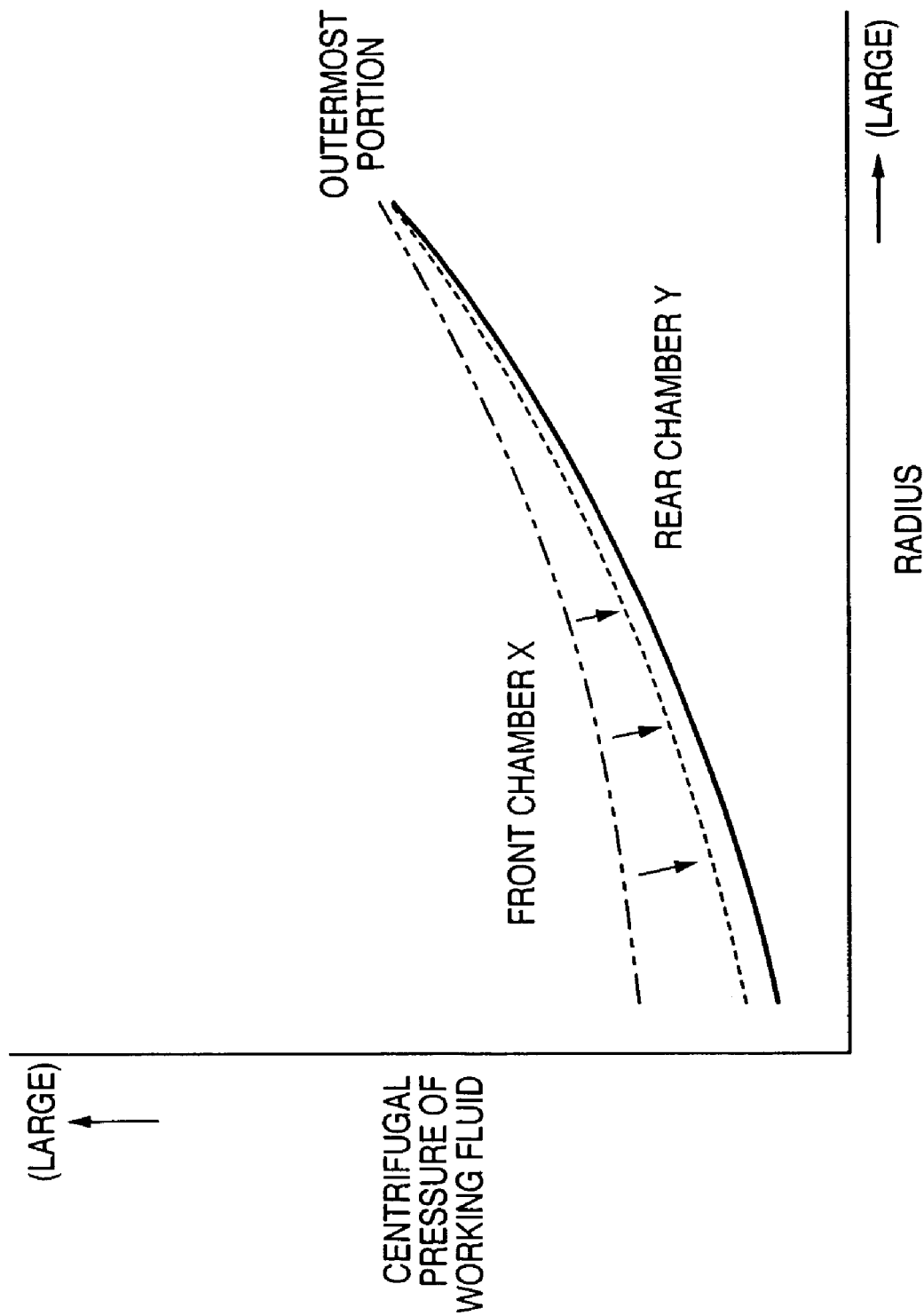
FIG. 5 is a graph for explaining the distribution of the centrifugal pressure of a working fluid in front and rear chambers in a torque converter according to the embodiment of the present invention.
Figure 6:
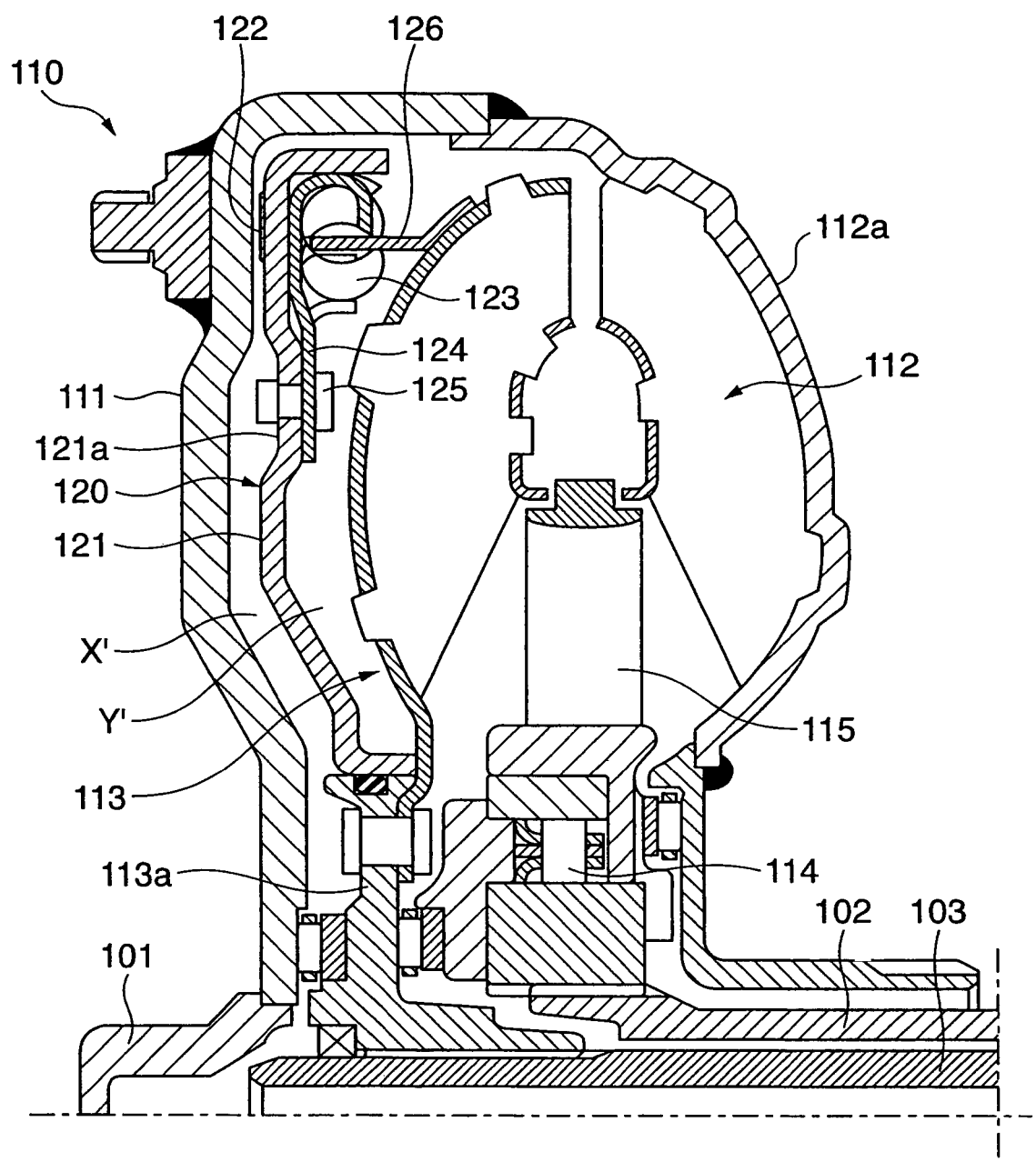
FIG. 6 is a longitudinal sectional view of a conventional torque converter.
Figure 7:
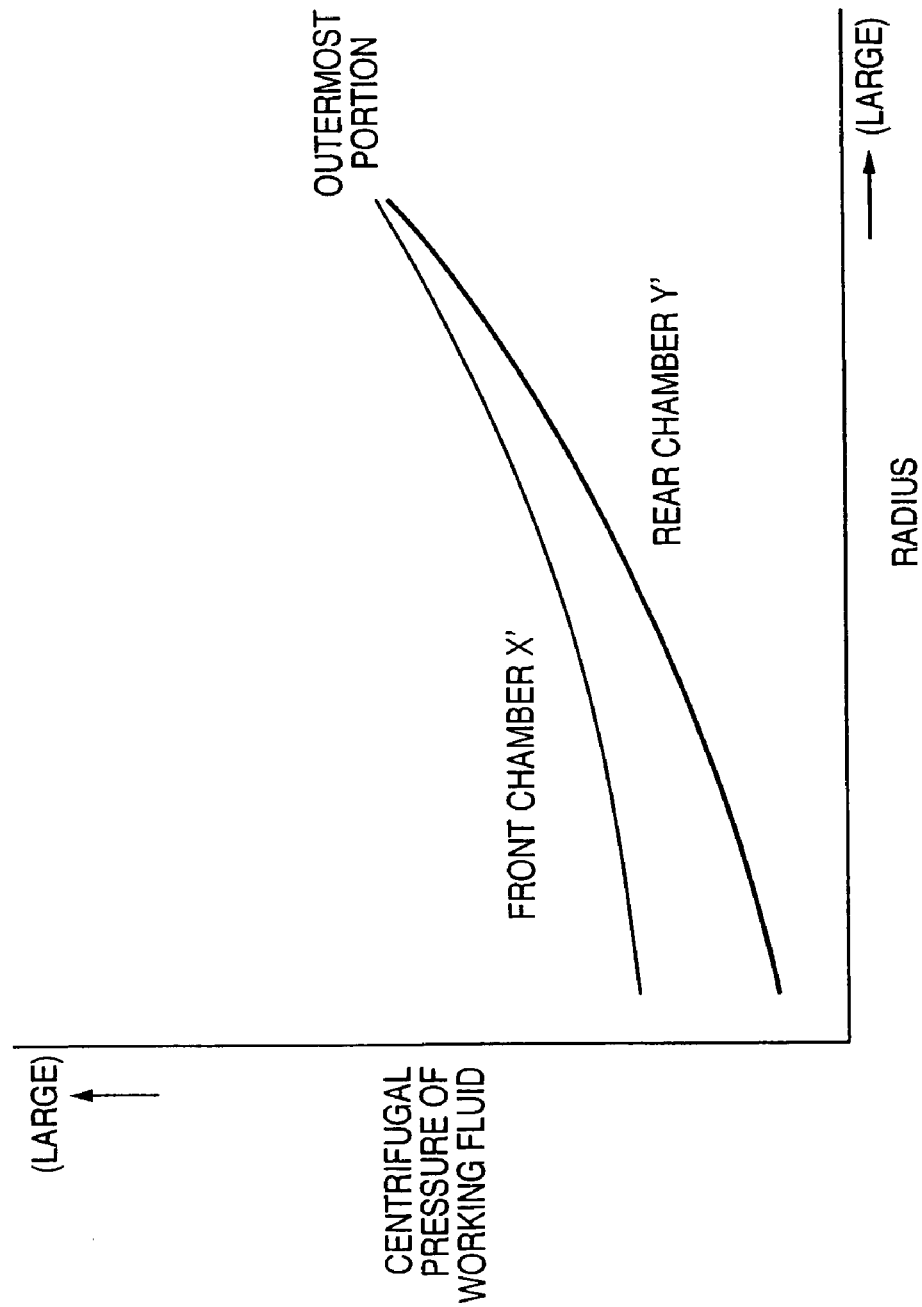
FIG. 7 is a graph for explaining the distribution of the centrifugal pressure of a working fluid in front and rear chambers in the conventional torque converter.

As the projections 21b are formed to project toward the front cover 11, the gap between that portion of the piston 21 which is inside the friction member 22 and the front cover 11 becomes narrow. As a result, the working fluid between the front cover 11 and piston 21 (front chamber X) is held well by the projections 21b. As the held working fluid is rotated together with the piston 21, the rotational speed of the working fluid becomes higher than that of a case wherein no projections 21b are formed. At this time, the centrifugal pressure of the working fluid in the front chamber X decreases more on the inner side than in the conventional case, as indicated by a broken line in FIG. 5, to decrease the pressure difference between before and after the piston 21. As a result, when the engine is driven by the output side, the axial movement of the piston 21 toward the front cover 11 is prevented from being interfered with by the centrifugal pressure difference between before and after the piston 21. In other words, the locking response speed of the lockup clutch 20 improves.

As the projections 21b project from the surface of the piston 21, they can be formed easily by pressing or the like. The projections 21b can be formed easily by only changing the piston without largely changing the structure of the existing lockup clutch or torque converter. The axial length or the like of the torque converter does not increase, and the size of the torque converter doe not increase.

As the projections 21b and fixing portions 21a are alternately arranged in the circumferential direction, their positions and shapes can be set freely in the radial direction.

As the projections 21b and fixing portions 21a are evenly arranged on a circumference, irregular fluctuations in working hydraulic pressure and rotation are prevented. Accordingly, the locking properties of the lockup clutch 20 are stabilized. In particular, in this embodiment, as the projections 21b and fixing portions 21a are arranged alternately and evenly in the circumferential direction, irregular fluctuations in working hydraulic pressure and rotation are prevented much better, and the function described above becomes more stable.

As the fixing portions 21a for the support member 24 of the damper springs 23 bulge to the counter front cover 11 side, the space capacity between the piston 21 and front cover 11 (front chamber X) increases, and accordingly the amount of working fluid that can be carried by the projections 21b increases. The working hydraulic pressure between the piston 21 and front cover 11 can decrease easily, so that the effect of improving the locking response speed is improved more. In particular, according to this embodiment, the space capacity among the projections 21b increases, so that the effect described above becomes more reliable.

According to this embodiment, the projections 21b extend in the radial direction. Alternatively, the projections 21b can be inclined so that the outer side is located ahead of the inner side in the rotational direction of the piston 21. Then, the working fluid between the piston 21 and front cover 11 which is to flow out to the outer side by the centrifugal force can be held well. As a result, the rotational speed of the working fluid can be increased more stably, and the effect of improving the locking response speed becomes better.

According to this embodiment, the projections 21b and fixing portions 21a are arranged alternately and evenly. However, the present invention is not limited to this. For example, a plurality of projections may be formed between two fixing portions. Conversely, the projections need not be formed between all the fixing portions but, e.g., can be formed between every other pair of fixing portions.

The present invention can be widely applied to a fluid transmission apparatus which has a lockup clutch.

The embodiment of the present invention has been described above. According to this embodiment, in the fluid transmission apparatus which has the lockup clutch and in which the support member for the damper springs is fixed to a plurality of portions on a predetermined circumference of the lockup piston which are inside the friction member, the projections extending substantially in the radial direction are formed, on that portion of the lockup piston which is inside the friction member, at positions sandwiched by the fixing portions for the damper spring support member. Thus, the long projections can be arranged efficiently in the limited space in the torque converter without interfering with the fixing portions.

As the projections are formed to project toward the front cover, the gap between that portion of the piston which is inside the friction member and the front cover becomes narrow. As a result, the fluid between the front cover and piston is held well by the projections. As the held fluid is rotated together with the lockup piston by the projections, the rotational speed of the fluid becomes higher than that of a case wherein no projections are formed. Namely, the centrifugal pressure of the fluid between the front cover and lockup piston decreases, to decrease the difference in centrifugal pressure of the fluid between before and after the lockup piston. As a result, when the engine is driven by the output side, the axial movement of the lockup piston toward the front cover is prevented from being interfered with by the difference in centrifugal pressure. Accordingly, the locking response speed of the lockup clutch is improved.

As the projections project from the surface of the lockup piston, they can be formed easily by pressing or the like. The projections can be formed easily by only changing the lockup piston without largely changing the structure of the existing lockup clutch or torque converter.

The projections extending substantially in the radial direction on that portion of the lockup piston which is inside the friction member, and the fixing portions for the damper spring support member are alternately arranged in the circumferential direction. Therefore, the positions and shapes of the projections and fixing portions can be set freely in the radial direction.

The projections extending substantially in the radial direction on that portion of the lockup piston which is inside than the friction member, and the fixing portions for the support member of the damper springs are evenly arranged on circumferences. Therefore, irregular fluctuations in hydraulic pressure and rotation are prevented well. Accordingly, the locking properties of the lockup clutch are stabilized. In particular, as the projections and fixing portions are arranged alternately and evenly in the circumferential direction, irregular fluctuations in hydraulic pressure and rotation are prevented much better, and the function described above becomes more stable.

As the fixing portions for the support member of the damper springs bulge to the counter front cover side, the space capacity between the lockup piston and front cover increases, and accordingly the amount of working fluid that can be carried by the projections increases. The hydraulic pressure between the lockup piston and front cover can decrease easily, so that the effect of improving the locking response speed is enhanced more. In particular, the space capacity among the projections increases, so that the effect described above becomes more reliable.

The projections which extend substantially in the radial direction on that portion of the lockup piston which is inside the friction member are inclined so that the outer side is located ahead of the inner side in the rotational direction of the lockup piston. Then, the working fluid between the lockup piston and front cover which is to flow out to the outer side by the centrifugal force can be held well. As a result, the rotational speed of the working fluid can be increased more stably, and the effect of improving the locking response speed becomes better.

As many apparently widely different embodiments of the present invention can be made without departing from the spirit and scope thereof, it is to be understood that the invention is not limited to the specific embodiments thereof except as defined in the appended claims.

CLAIM OF PRIORITY

This application claims priority from Japanese Patent Application No. 2004-096201 filed Mar. 29, 2004, which is hereby incorporated by reference herein.

What is claimed is:

1. A fluid transmission apparatus used together with a vehicle change gear and having a lockup clutch, comprising:
    an input member which inputs a driving force from an engine to the fluid transmission apparatus;
    an output member which outputs the driving force from the fluid transmission apparatus to said vehicle change gear;
    a front cover coupled to said input member; a turbine coupled to said output member;
    a lockup piston which is arranged between said front cover and turbine and moved in an axial direction by a change in hydraulic pressure;
    a friction member formed on an outer portion of a surface of said lockup piston which opposes said front cover;
    a damper spring which connects said lockup piston and turbine;
    a support member for said damper spring which is fixed to a plurality of fixing portions on a predetermined circumference of said lockup piston which are inside said friction member; and
    projections projecting toward said front cover from positions on said lockup piston which are sandwiched by said fixing portions,
    wherein said projections and said fixing portions are arranged alternately in a circumferential direction and said projections radially extend from around an inner cylindrical portion of said lockup piston to an outer part of the fixing portions.

2. The apparatus according to claim 1, wherein said projections and fixing portions are arranged evenly in the circumferential direction.

3. The apparatus according to claim 1, wherein said fixing portions bulge to a side opposite to said front cover.

4. A fluid transmission apparatus used together with a vehicle change gear and having a lockup clutch, comprising:
    an input member which inputs a driving force from an engine to the fluid transmission apparatus;
    an output member which outputs the driving force from the fluid transmission apparatus to said vehicle change gear;
    a front cover coupled to said input member;
    a turbine coupled to said output member;
    a lockup piston which is arranged between said front cover and turbine and moved in an axial direction by a change in hydraulic pressure;

a friction member formed on an outer portion of a surface of said lockup piston which opposes said front cover;
a damper spring which connects said lockup piston and turbine;
a support member which supports said damper spring;
fixing portions which bulge to a side opposite to said front cover so as to fix said support member to a plurality of locations on a predetermined circumference of said lockup piston which are inside said friction member; and
projections projecting toward said front cover from positions on said lockup piston which are sandwiched by said fixing portions,
wherein said projections and said fixing portions are arranged alternately in a circumferential direction and said projections radially extend from around an inner cylindrical portion of said lockup piston to an outer part of the fixing portions.

* * * * *

UNITED STATES PATENT AND TRADEMARK OFFICE
CERTIFICATE OF CORRECTION

PATENT NO. : 7,228,950 B2
APPLICATION NO. : 11/078474
DATED : June 12, 2007
INVENTOR(S) : Junichi Doi et al.

Page 1 of 1

It is certified that error appears in the above-identified patent and that said Letters Patent is hereby corrected as shown below:

Title Page, Column 1 Item 73 (Assignees), Line 1, change "Company," to --Corporation,--.

Signed and Sealed this

Eighth Day of April, 2008

JON W. DUDAS
*Director of the United States Patent and Trademark Office*